R. ZAHN.
JACQUARD EMBROIDERING MACHINE.
APPLICATION FILED JUNE 17, 1912.
1,065,095.
Patented June 17, 1913.
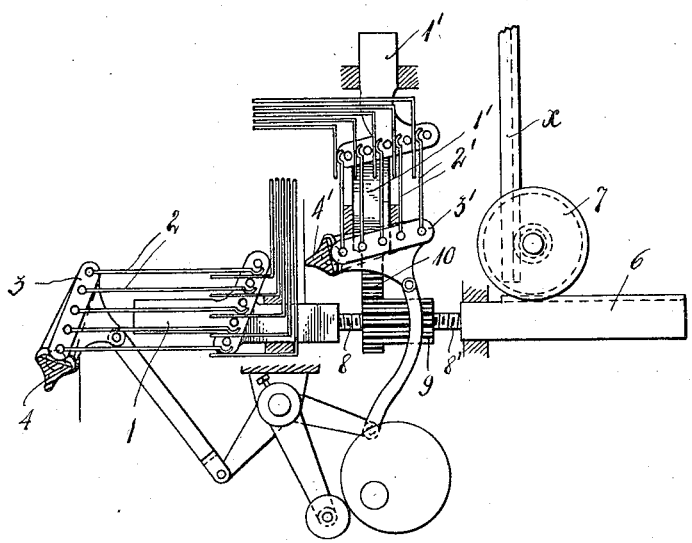
Witnesses:
C. S. Ashley
J. J. Donohue
Inventor
Robert Zahn
By his Attorney
Max F. Ordmann

UNITED STATES PATENT OFFICE.

ROBERT ZAHN, OF PLAUEN, GERMANY.

JACQUARD EMBROIDERING-MACHINE.

1,065,095.  Specification of Letters Patent.  Patented June 17, 1913.

Original application filed February 5, 1910, Serial No. 542,305. Divided and this application filed June 17, 1912. Serial No. 704,107.

*To all whom it may concern:*

Be it known that I, ROBERT ZAHN, a subject of the German Emperor, residing at Plauen, Kingdom of Saxony, Germany, have invented certain new and useful Improvements in Jacquard Embroidering-Machines, of which the following is a specification.

The invention relates to embroidering machines of the automatic type and more particularly to a mechanism for adding up or totaling the large and the small movements of the embroidery frame and is a division from the application 542,305 filed Feb. the 5th, 1910 and allowed Dec. the 5th, 1911, Patent No. 1,031,159, issued July 2, 1912. The transmission of movement to the embroidery frame in different directions is effected automatically in the manner described and illustrated in the above named Letters Patent by means of jacquard controlled allotting members.

In the accompanying drawing which forms a part of this specification and in which similar reference characters denote corresponding parts a lateral elevation is shown, illustrating more or less diagrammatically an automatic embroidering machine according to this invention.

With reference to the drawing 1 denotes a horizontal slide and $1^1$ a vertical slide. From these slides the various movements are transmitted to the embroidery frame (not shown) by means of a toothed slide 6, coöperating with gear wheels 7, and rack $x$, as fully described and shown in my Letters Patent above referred to and whereby the direction of movement is determined.

The slides are operated from allotting members comprising horizontal and vertical coupling rods 2, $2^1$ which are pivotally connected to rocking levers 3, $3^1$ in such a manner that the coupling rods 2, $2^1$ are given different throws, according as they are arranged farther from or nearer to the fulcrums 4, $4^1$ of their respective levers 3, $3^1$. For combining or totaling the different movements imparted to said slides 1, $1^1$ I provide the following mechanism. The slides 1 and 6 are provided with oppositely threaded spindles 8, $8^1$ arranged in linear extension of one another and united by an externally toothed nut 9. The vertical slide $1^1$ is provided at its tail end with a rack 10 engaging the circumference of the nut 9.

On the slide 1 being reciprocated the nut 9 will be caused to slide transversely to the rack 10, without imparting movement thereto and on the slide $1^1$ being reciprocated the rack will impart rotary movement to the nut which will be transmitted to the slides 1 and 6 drawing the latter together or moving them away from one another. Assuming that the slide 1 is caused to perform a horizontal movement while the slide $1^1$ is stationary, the nut being shifted transversely to the rack 10 will move the slide 6 exactly the same distance as the slide 1. Supposing now the slide 1 to be stationary and the slide $1^1$ to be caused to make a vertical movement, it will be seen, that the rack 10 will impart rotary motion to the nut 9 whereby the slide 6 will receive a fraction of the movement of the slide $1^1$, the ratio of the two movements depending on the pitch of the thread of the spindles 8, $8^1$. Assuming now this ratio to be 1 : 10 and the slide 1 to travel horizontally a distance of say 5 mm. and simultaneously the slide $1^1$ to perform a vertical movement of say 3 mm. These two movements are both transmitted to the slide 6 which is thus moved to the extent of 5.3 mm., owing to the throw of 5 mm. being directly transmitted to the slide 6, whereas the throw of 3 mm. is reduced to the tenth part of the movement performed by the slide $1^1$. In this manner the throw of the slide 6 may be varied at will according to the operation of the coupling rods 2, $2^1$ under the action of the jacquard mechanism. Its shortest displacement 0.1 mm. the slide 6 receives in the event of the slide 1 being stationary and the slide $1^1$ being drawn down by the coupling rod $2^1$ which in the drawing is farthest to the left, that is to say, which is nearest the fulcrum $4^1$. A throw of 0.9 mm. is transmitted to the slide 6 upon the slide 1 being again stationary while the slide $1^1$ is drawn down by the coupling rod $2^1$ which in the drawing is farthest to the right, that is to say, remotest from the fulcrum $4^1$. The throw of the slide 6 becomes 1 mm. when the slide $1^1$ is stationary and slide 1 is moved to the right by the coupling rod 2 which in the drawing occupies the lowermost position.

The largest possible throw of the slide 6 is 9. 9 mm. and is attained when both slides 1 and $1^1$ are moved by the coupling rods 2 and $2^1$ respectively which are remotest from the respective fulcrums 4, $4^1$.

The above numbers are of course mere examples and the question as to whether the shortest throw should be 0.1 mm. and the largest 9.9 mm. depends entirely on circumstances and on the minimum throw chosen under particular conditions. Thus if, for instance, for the minimum throw 0.25 mm. is chosen the corresponding maximum throw would be 24.75 mm.

What I claim and desire to secure by Letters Patent is:

1. In an automatic embroidering machine, the combination with jacquard controlled horizontal and vertical allotting members and a driven member, of a mechanism for combining the different movements of said allotting members and comprising oppositely threaded parts on one of said allotting members and a pinion working as a nut on said threaded parts and connecting the same and means on the other allotting member operatively connected to said nut to feed the latter.

2. In an automatic embroidering machine, the combination with jacquard controlled horizontal and vertical allotting members and a driven member, of a mechanism for combining the different movements of said allotting members and comprising oppositely threaded parts on one of said allotting members and a pinion working as a nut on said threaded parts and connecting the same and a rack formed on the other allotting member and coöperating with said nut to feed the latter.

In testimony whereof I affix my signature in presence of two witnesses.

ROBERT ZAHN.

Witnesses:
  A. CURTIS ROTH,
  ROBERT H. NIER.

---

Copies of this patent may be obtained for five cents each, by addressing the "Commissioner of Patents, Washington, D. C."